Patented Mar. 17, 1936

2,033,976

UNITED STATES PATENT OFFICE 2,033,976

TREATMENT OF TEXTILE OR OTHER MATERIALS

Henry Dreyfus, London, England

No Drawing. Application August 7, 1930, Serial No. 473,780. In Great Britain October 8, 1929

4 Claims. (Cl. 91—68)

This invention relates to the fixation of luminous or phosphorescent substances on or in textile or other materials, especially materials made of or containing cellulose acetate or other cellulose esters or ethers.

According to the present invention, the fixation of phosphorescent or luminous substances on or in textile or other materials is effected by applying them to the said materials while the latter are in a softened state. In this manner, phosphorescent or luminous effects may be produced, for example on a textile material or film, or other article made of or containing cellulose acetate or other cellulose ester.

The luminous or phosphorescent materials employed according to the invention are those in which phosphorescence is induced by exposure to light and do not include materials which emit light spontaneously. For example there may be employed according to the invention zinc sulphide which has been endowed with phosphorescent or luminous properties, e. g. by suitable heat treatment after addition of a promoter such as magnesium chloride containing a small quantity of a copper compound. For application in accordance with the present invention the phosphorescent or luminous materials should preferably be as finely divided as possible, and most advantageously are actually prepared in such finely divided state. Though a suitably prepared zinc sulphide has been found very convenient, any other luminous or phosphorescent substance may be employed, e. g. barium sulphide or calcium sulphide which has been subjected to suitable treatment. The material should, however, be selected with due regard to the treatment to which the treated articles may subsequently be called upon to receive.

The new process may be applied for the production of decorative effects on filaments, yarns, fabrics or the like, made of cotton or other cellulosic material, e. g. regenerated cellulose, or made of silk, but the invention is most readily applied to the treatment of materials made of or containing cellulose esters, for instance cellulose nitrate, organic acid esters such as cellulose acetate, formate, propionate, or butyrate, or made of or containing cellulose ethers, e. g. methyl, ethyl or benzyl cellulose, or the condensation products obtainable from cellulose and glycols or other polyhydric alcohols. Thus phosphorescent effects may be produced on a cellulose acetate fabric by treating with a suitable softening or swelling agent and then applying in any desired manner a phosphorescent material, such as phosphorescent zinc sulphide in finely divided form.

Any suitable softening or swelling agents may be used for the purpose of the present invention, and the choice in any particular case will depend upon the material and the structure of the article to be treated. Thus, for materials made from cellulosic fibers, a solution of zinc chloride or Schweitzer's Reagent or caustic alkali may be employed, and in this case the material may be mercerized simultaneously with the fixation of the phosphorescent materials. Materials made of or containing cellulose acetate or other cellulose esters or cellulose ethers possess the great advantage that there exists a very wide range of substances which may be employed as swelling agents or softening agents in the process of the present invention. Thus for example there may be used aqueous solutions of thiocyanates, or there may be employed organic substances having a solvent or softening action on cellulose esters or ethers e. g. acetone or other ketone, ethyl or other alcohol for instance diacetone alcohol, phenolic bodies such as phenol, cresols, or the like, acids such as formic, acetic, or butyric acid, applied either as such or in the form of solutions, suspensions or dispersions in water or other liquid. The swelling or softening agent should be such as will have no deleterious effect on the phosphorescent or luminous materials subsequently to be fixed on the material. The application of the swelling or softening medium may be effected in any desired manner; for instance a fabric or other textile material may be passed through a bath containing the softening or swelling agent, or the latter may be applied by printing, stenciling or other means of local application, if necessary after addition of a suitable thickening agent.

In some cases, however, a special treatment to effect softening of the materials is unnecessary. Thus, for example, the phosphorescent materials may be applied to artificial filaments, yarns, or other materials during manufacture of the latter and before they are completely set or coagulated. For instance the finely divided material may be applied to filaments of cellulose acetate as they issue from a dry-spinning machine or metier and before they are completely set.

The phosphorescent or luminous substances may likewise be applied to the softened materials in any desired or convenient manner, e. g. they may be dusted on to the materials or blown on to the materials by means of a current of air or other gas. Another method is by application in the form of aqueous suspensions whether in liquid or paste form. The material may be passed through a bath of such aqueous suspension, or may be printed either locally or over the whole surface with a paste containing a phosphorescent substance. Very conveniently the zinc sulphide or other substance to be fixed on the material may be applied simultaneously with the swelling agent, e. g. the material may be treated in a bath, or printed with a paste, containing both the swelling or softening agent and the finely divided phosphorescent material, a method which has been found particularly advantageous for the production of phosphorescent effects on cellulose ester or ether materials.

If desired, other pigments or finely divided materials may be fixed to the fabrics or articles simultaneously with the phosphorescent materials. Thus, for example, a fabric or other article may be treated with a substance having a solvent action and then with a mixture of finely divided phosphorescent material and another pigment or the fabric may be printed with a paste containing a swelling agent, a phosphorescent substance and another finely divided pigment or like material.

The materials to be treated by the new process may be dyed or otherwise suitably coloured, either prior to, during or after the process; thus for example the phosphorescent materials may be affixed to a previously dyed fabric, or, particularly in the case of materials made of cellulose esters or ethers, a suitable colouring matter in finely divided or dispersed form may be applied together with the phosphorescent material.

If desired, and particularly where the articles treated may be subjected to severe mechanical wear or rubbing, the surface may be protected by the subsequent application of a layer of a suitable varnish or like material. In the case of materials made of or containing cellulose esters or ethers, such protective layer may advantageously comprise a cellulose derivative of solubility characteristics different from that of the base, so that it may be applied as a solution in a liquid having little or no solvent action on the said base.

The following examples show the best ways known to me of carrying the invention into effect:

Example 1

A fabric woven from cellulose acetate yarns or in part from cellulose acetate yarns and in part from cotton yarns, is printed, either in a pattern or over the whole surface, with the following preparation:—

| | Parts |
|---|---|
| Gum arabic 1:1 | 100 |
| Acetone | 115 |
| Finely divided phosphorescent zinc sulphide | 15 |

After printing, the material is dried, and carefully washed and again dried. A fabric is obtained exhibiting phosphorescent effects, uniform or local according to the mode of application.

Example 2

A cellulose acetate woven fabric or a cellulose acetate film is stencilled with the following preparation which may be applied by means of a brush or by means of a spraying gun.

| | Parts |
|---|---|
| Acetone | 40 |
| Alcohol | 30 |
| Butyl acetate | 50 |
| Nitrocellulose | 5 |
| Camphor | 1 |
| Mixed isomeric xylenemonomethyl-sulphonamides | 8 |
| Finely divided phosphorescent zinc sulphide | 10 |

After drying the fabric or film exhibits phosphorescent effects which are resistant to rubbing.

What I claim and desire to secure by Letters Patent is:—

1. Process for the production of phosphorescent textile filaments which comprises applying phosphorescent zinc sulphide to the surfaces only of filaments containing organic derivatives of cellulose, directly after their formation and while they are still in a swollen condition.

2. Process for the production of phosphorescent filaments which comprises applying phosphorescent textile zinc sulphide to the surfaces only of filaments containing cellulose acetate, directly after their formation and while they are still in a swollen condition.

3. Textile materials comprising organic derivatives of cellulose having phosphorescent zinc sulphide fixed in their surfaces only.

4. Textile materials comprising cellulose acetate having phosphorescent zinc sulphide fixed in their surfaces only.

HENRY DREYFUS.

---

CERTIFICATE OF CORRECTION.

Patent No. 2,033,976.     March 17, 1936.

HENRY DREYFUS.

It is hereby certified that error appears in the printed specification of the above numbered patent requiring correction as follows: Page 2, second column, line 41, claim 2, strike out the word "textile" and insert the same before "filaments" in line 40, same claim; and that the said Letters Patent should be read with this correction therein that the same may conform to the record of the case in the Patent Office.

Signed and sealed this 28th day of April, A. D. 1936.

Leslie Frazer

Seal)     Acting Commissioner of Patents.

uid or paste form. The material may be passed through a bath of such aqueous suspension, or may be printed either locally or over the whole surface with a paste containing a phosphorescent substance. Very conveniently the zinc sulphide or other substance to be fixed on the material may be applied simultaneously with the swelling agent, e. g. the material may be treated in a bath, or printed with a paste, containing both the swelling or softening agent and the finely divided phosphorescent material, a method which has been found particularly advantageous for the production of phosphorescent effects on cellulose ester or ether materials.

If desired, other pigments or finely divided materials may be fixed to the fabrics or articles simultaneously with the phosphorescent materials. Thus, for example, a fabric or other article may be treated with a substance having a solvent action and then with a mixture of finely divided phosphorescent material and another pigment or the fabric may be printed with a paste containing a swelling agent, a phosphorescent substance and another finely divided pigment or like material.

The materials to be treated by the new process may be dyed or otherwise suitably coloured, either prior to, during or after the process; thus for example the phosphorescent materials may be affixed to a previously dyed fabric, or, particularly in the case of materials made of cellulose esters or ethers, a suitable colouring matter in finely divided or dispersed form may be applied together with the phosphorescent material.

If desired, and particularly where the articles treated may be subjected to severe mechanical wear or rubbing, the surface may be protected by the subsequent application of a layer of a suitable varnish or like material. In the case of materials made of or containing cellulose esters or ethers, such protective layer may advantageously comprise a cellulose derivative of solubility characteristics different from that of the base, so that it may be applied as a solution in a liquid having little or no solvent action on the said base.

The following examples show the best ways known to me of carrying the invention into effect:

Example 1

A fabric woven from cellulose acetate yarns or in part from cellulose acetate yarns and in part from cotton yarns, is printed, either in a pattern or over the whole surface, with the following preparation:—

| | Parts |
|---|---|
| Gum arabic 1:1 | 100 |
| Acetone | 115 |
| Finely divided phosphorescent zinc sulphide | 15 |

After printing, the material is dried, and carefully washed and again dried. A fabric is obtained exhibiting phosphorescent effects, uniform or local according to the mode of application.

Example 2

A cellulose acetate woven fabric or a cellulose acetate film is stencilled with the following preparation which may be applied by means of a brush or by means of a spraying gun.

| | Parts |
|---|---|
| Acetone | 40 |
| Alcohol | 30 |
| Butyl acetate | 50 |
| Nitrocellulose | 5 |
| Camphor | 1 |
| Mixed isomeric xylenemonomethyl-sulphonamides | 8 |
| Finely divided phosphorescent zinc sulphide | 10 |

After drying the fabric or film exhibits phosphorescent effects which are resistant to rubbing.

What I claim and desire to secure by Letters Patent is:—

1. Process for the production of phosphorescent textile filaments which comprises applying phosphorescent zinc sulphide to the surfaces only of filaments containing organic derivatives of cellulose, directly after their formation and while they are still in a swollen condition.

2. Process for the production of phosphorescent filaments which comprises applying phosphorescent textile zinc sulphide to the surfaces only of filaments containing cellulose acetate, directly after their formation and while they are still in a swollen condition.

3. Textile materials comprising organic derivatives of cellulose having phosphorescent zinc sulphide fixed in their surfaces only.

4. Textile materials comprising cellulose acetate having phosphorescent zinc sulphide fixed in their surfaces only.

HENRY DREYFUS.

---

CERTIFICATE OF CORRECTION.

Patent No. 2,033,976.   March 17, 1936.

HENRY DREYFUS.

It is hereby certified that error appears in the printed specification of the above numbered patent requiring correction as follows: Page 2, second column, line 41, claim 2, strike out the word "textile" and insert the same before "filaments" in line 40, same claim; and that the said Letters Patent should be read with this correction therein that the same may conform to the record of the case in the Patent Office.

Signed and sealed this 28th day of April, A. D. 1936.

Leslie Frazer

Seal)   Acting Commissioner of Patents.